United States Patent
Park et al.

(10) Patent No.: US 11,814,008 B2
(45) Date of Patent: Nov. 14, 2023

(54) AIRBAG DEVICE OF VEHICLE AND CONTROL METHOD THEREOF

(71) Applicant: HYUNDAI MOBIS CO., LTD., Seoul (KR)

(72) Inventors: Hae Kwon Park, Yongin-si (KR); Jun Sung Park, Yongin-si (KR); Byeung Su Kim, Yongin-si (KR); Mun Hyoung Yoon, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 47 days.

(21) Appl. No.: 17/569,404

(22) Filed: Jan. 5, 2022

(65) Prior Publication Data

US 2022/0212617 A1    Jul. 7, 2022

(30) Foreign Application Priority Data

Jan. 7, 2021    (KR) .......................... 10-2021-0002237

(51) Int. Cl.
*B60R 21/26*    (2011.01)
*B60R 21/015*    (2006.01)
(Continued)

(52) U.S. Cl.
CPC ............ *B60R 21/26* (2013.01); *B60R 21/015* (2013.01); *B60R 21/0132* (2013.01);
(Continued)

(58) Field of Classification Search
CPC ............. B60R 21/015; B60R 21/0132; B60R 21/0136; B60R 21/26; B60R 21/233;
(Continued)

(56) References Cited

U.S. PATENT DOCUMENTS 6,158,767 A * 12/2000 Sinnhuber ............... B60R 21/26
                                                              280/739
6,237,948 B1 * 5/2001 Maschek ................. B60R 21/01
                                                              280/736
(Continued)

FOREIGN PATENT DOCUMENTS

CN    113511166 A  * 10/2021
DE    10352140 A1  * 6/2005   ........... B60R 21/231
(Continued)

OTHER PUBLICATIONS

Park, 'Machine Translation of KR 20200094360 Obtained Oct. 13, 2022', Aug. 7, 2020, Entire Document. (Year: 2020).*

*Primary Examiner* — Nicole T Verley
(74) *Attorney, Agent, or Firm* — DLA PIPER LLP (US)

(57) ABSTRACT

An airbag device of a vehicle and a control method thereof. The airbag device of a vehicle includes a detection unit configured to detect collision information of a vehicle and seating state information of an occupant, an airbag unit including a plurality of airbag modules, each of the airbag modules being configured to be inflated from a contracted state as working gas is supplied and to be restored to the contracted state as the working gas is discharged, a valve unit configured to regulate the working gas supplied to the airbag unit, and a control unit configured to determine a hitting position based on the collision information and the seating state information, and to control the valve unit to supply the working gas to a target airbag module installed at the hitting position, thereby inflating the target airbag module.

12 Claims, 8 Drawing Sheets

(51) Int. Cl.
  *B60R 21/0136* (2006.01)
  *B60R 21/0132* (2006.01)
  *B60R 21/01* (2006.01)

(52) U.S. Cl.
  CPC .. *B60R 21/0136* (2013.01); *B60R 2021/0102* (2013.01); *B60R 2021/01068* (2013.01); *B60R 2021/01231* (2013.01)

(58) Field of Classification Search
  CPC ............. B60R 21/013; B60R 21/2338; B60R 2021/0102; B60R 2021/01068; B60R 2021/01231; B60R 2021/26094; B60R 21/216; B60R 13/0206
  See application file for complete search history.

(56) References Cited

U.S. PATENT DOCUMENTS

| | | | | |
|---|---|---|---|---|
| 2001/0039468 A1* | 11/2001 | Seidl | ................... | B60R 21/0132 701/45 |
| 2002/0053787 A1* | 5/2002 | Hanoun | ............... | B60R 21/015 280/734 |
| 2005/0184495 A1* | 8/2005 | Zerbe | ....................... | B60L 3/04 180/282 |
| 2006/0097496 A1* | 5/2006 | Theisen | ............ | B60R 21/01542 280/735 |
| 2013/0062866 A1* | 3/2013 | Breed | ..................... | B60R 21/30 280/731 |
| 2014/0042733 A1* | 2/2014 | Fukawatase | ........ | B60R 21/0136 280/730.2 |
| 2015/0054269 A1* | 2/2015 | Kolatschek | ............. | B60R 21/01 280/737 |
| 2017/0120851 A1* | 5/2017 | Garcia Gomez | ............................ | B60R 21/01542 |
| 2018/0225769 A1* | 8/2018 | Slusar | .................... | G05D 1/0055 |
| 2022/0203922 A1* | 6/2022 | Yamazaki | ........... | B60R 22/4628 |
| 2022/0219636 A1* | 7/2022 | Yamazaki | ................ | B60N 2/20 |

FOREIGN PATENT DOCUMENTS

| | | | | | |
|---|---|---|---|---|---|
| DE | 19610299 B4 | * | 7/2006 | ............ | B60R 21/015 |
| DE | 102007015957 A1 | * | 11/2007 | ....... | B60R 21/01508 |
| JP | 2010214977 A | * | 9/2010 | ............. | B60R 21/18 |
| KR | 20170087182 A | * | 7/2017 | | |
| KR | 20200094360 A | * | 8/2020 | | |
| WO | WO-0003899 A2 | * | 1/2000 | ......... | B29C 37/0057 |

* cited by examiner

AIRBAG DEVICE OF VEHICLE AND CONTROL METHOD THEREOF

CROSS-REFERENCE TO RELATED APPLICATION

This application claims priority from and the benefit of Korean Patent Application No. 10-2021-0002237, filed on Jan. 7, 2021, which is hereby incorporated by reference for all purposes as if set forth herein.

BACKGROUND

Field

Exemplary embodiments of the present disclosure relate to an airbag device of a vehicle and a control method thereof, and more particularly, to an airbag device of a vehicle, capable of protecting an occupant in all directions in a vehicle interior and a control method thereof.

Discussion of the Background

An airbag for a vehicle is a safety device that deploys an airbag cushion in the event of a collision to attenuate an impact on an occupant and substantially prevents a passenger from being thrown out of a vehicle body. The airbag for a vehicle may be classified into a driver airbag (DAB) and a passenger airbag (PAB) for protecting passengers on front seats in the event of a head-on collision, a side airbag (SAB) and a curtain airbag (CAB) for protecting sides of passengers in the event of a lateral collision, a center airbag for substantially preventing injuries caused by a collision between a driver and an occupant on a passenger seat and a collision among occupants on back seats in the event of a lateral collision, and the like.

Since the airbag system in the related art described above is based on the premise that an occupant is normally seated in a vehicle seat, a situation in which the occupant is injured due to the deployment of the airbag frequently occurs depending on the seating state of the occupant. Furthermore, since the airbag system in the related art has a limitation of one-time deployment, there is a problem in that excessive time and money are required as related parts need to be entirely replaced after the airbag is deployed.

Furthermore, in the case of an autonomous vehicle, since the driving control right is transferred from an occupant to a vehicle system, the seating state of the occupant who has no driving control right is not a fixed normal seating state and may be changed very variously depending on an intended operation of the occupant. Therefore, the airbag system in the related art that based on the premise that an occupant is normally seated in a vehicle seat may not completely protect an occupant of an autonomous vehicle. Moreover, when considering that various entertainment facilities (for example, tables, displays, and the like) for an occupant who has no driving control right may be installed in the autonomous vehicle, there is a limitation in securing a mounting space for an airbag system installed in a fixed position (for example, a steering wheel central horn, a dashboard, and the like) in the related art.

SUMMARY

The present disclosure has been made to solve the above problems, and an object according to one aspect of the present disclosure is to provide an airbag device of a vehicle, which is configured to be reusable by overcoming the limitation of an airbag system limited to one-time deployment, to effectively protect an occupant from a collision by covering various seating states of the occupant, and to be compatible with an airbag system in the related art, and a control method thereof.

An airbag device of a vehicle in accordance with an aspect of the present disclosure includes: a detection unit configured to detect collision information of a vehicle and seating state information of an occupant; an airbag unit including a plurality of airbag modules respectively installed at a plurality of positions of an interior material formed in an interior space of the vehicle, each of the airbag modules being configured to be inflated in a contracted state as working gas is supplied and to be restored to the contracted state as the working gas is discharged; a valve unit configured to regulate the working gas supplied to the airbag unit; and a control unit configured to determine a hitting position defined as a position of the interior material, at which the occupant is expected to be hit, on the basis of the collision information of the vehicle and the seating state information of the occupant detected by the detection unit, and to control the valve unit to supply the working gas to a target airbag module installed at the hitting position among the plurality of airbag modules, thereby inflating the target airbag module.

In the present disclosure, the collision information of the vehicle may include information on an amount of impact on the vehicle, the seating state information of the occupant may include image information of the occupant in an interior space of the vehicle, and the control unit may determine the hitting position on the basis of an impact direction acquired from the information on the amount of impact and a pose of the occupant acquired from the image information.

In the present disclosure, the airbag module may be installed between the interior material and a vehicle body frame, and may be configured to be inflated as working gas is supplied and to expand the interior material toward the occupant.

The present disclosure may further include a tether part configured to couple the interior material to the vehicle body frame so that a position of the interior material is changed with respect to the vehicle body frame and to substantially prevent scattering of the airbag module, and the tether part may be implemented with a stretchable elastic material and may be configured to closely fix the interior material to the vehicle body frame in a contracted state of the airbag module, and to be extended along with inflation of the airbag module.

In the present disclosure, the airbag module may include a protective film skin configured to cover the interior material, and cushion parts installed between the protective film skin and an outer surface of the interior material.

In the present disclosure, the vehicle may be applied with a conventional airbag system that is installed independently of the airbag unit at a position different from a position where the airbag unit is installed and is controlled to protect an occupant by the control unit when the occupant is seated according to a predefined normal seating condition, and when control for the airbag unit and control for the conventional airbag system are defined as first control and second control, respectively, the control unit may complementarily perform the first control and the second control according to the seating state information of the occupant.

In the present disclosure, the control unit may perform the first control when a pose of the occupant acquired from the image information does not satisfy the normal seating condition and perform the second control when the pose of the occupant satisfies the normal seating condition.

In the present disclosure, the valve unit may include a main valve and a plurality of sub-valves respectively provided in flow paths connected from the main valve to the plurality of airbag modules, and the main valve may be integrated into a valve unit constituting an air suspension system applied to the vehicle.

In the present disclosure, the control unit may control the valve unit to supply the working gas to the conventional airbag system, and a first flow path, through which the working gas is supplied from the valve unit to the airbag unit, and a second flow path, through which the working gas is supplied from the valve unit to the conventional airbag system, may share at least partially a common flow path.

A control method of an airbag device of a vehicle in accordance with an aspect of the present disclosure includes: a step in which a control unit acquires collision information of the vehicle and seating state information of an occupant detected by a detection unit; a step in which the control unit determines a hitting position defined as a position of the interior material, at which the occupant is expected to be hit, on the basis of the acquired collision information of the vehicle and seating state information of the occupant; and a step in which the control unit controls a valve unit to supply working gas to a target airbag module installed at the hitting position among a plurality of airbag modules, thereby inflating the target airbag module.

In the present disclosure, the collision information of the vehicle may include information on an amount of impact on the vehicle, the seating state information of the occupant may include image information of the occupant in an interior space of the vehicle, and in the step of determining, the control unit may determine the hitting position on the basis of an impact direction acquired from the information on the amount of impact and a pose of the occupant acquired from the image information.

In the present disclosure, the vehicle may be applied with a conventional airbag system that is installed independently of the airbag unit at a position different from a position where the airbag unit is installed and is controlled to protect an occupant by the control unit when the occupant is seated according to a predefined normal seating condition, and the control unit may complementarily control the airbag unit and the conventional airbag system according to the seating state information of the occupant.

In the present disclosure, the seating state information of the occupant may include image information of the occupant in an interior space of the vehicle, and the method may further include, after the step of acquiring: a step in which the control unit determines whether a pose of the occupant acquired from the image information satisfies the normal seating condition; and a step in which the control unit controls the conventional airbag system when it is determined that the pose of the occupant satisfies the normal seating condition, wherein the step of determining and the step of inflating are performed when it is determined that the pose of the occupant does not satisfy the normal seating condition.

In accordance with an aspect of the present disclosure, the present disclosure may protect an occupant in all directions in a vehicle interior by installing an airbag device in an interior material formed in an interior space of a vehicle instead of a fixed position in the related art, may reuse an airbag by adopting a structure in which working gas for deploying an airbag module is secured through an air suspension system applied to the vehicle and simultaneously is naturally discharged and disappear after the airbag is deployed, and may more completely protect the occupant of the vehicle from a collision through a method of complementarily operating the airbag device with a conventional airbag system previously applied to the vehicle.

DETAILED DESCRIPTION OF THE ILLUSTRATED EMBODIMENTS

Figure 1:
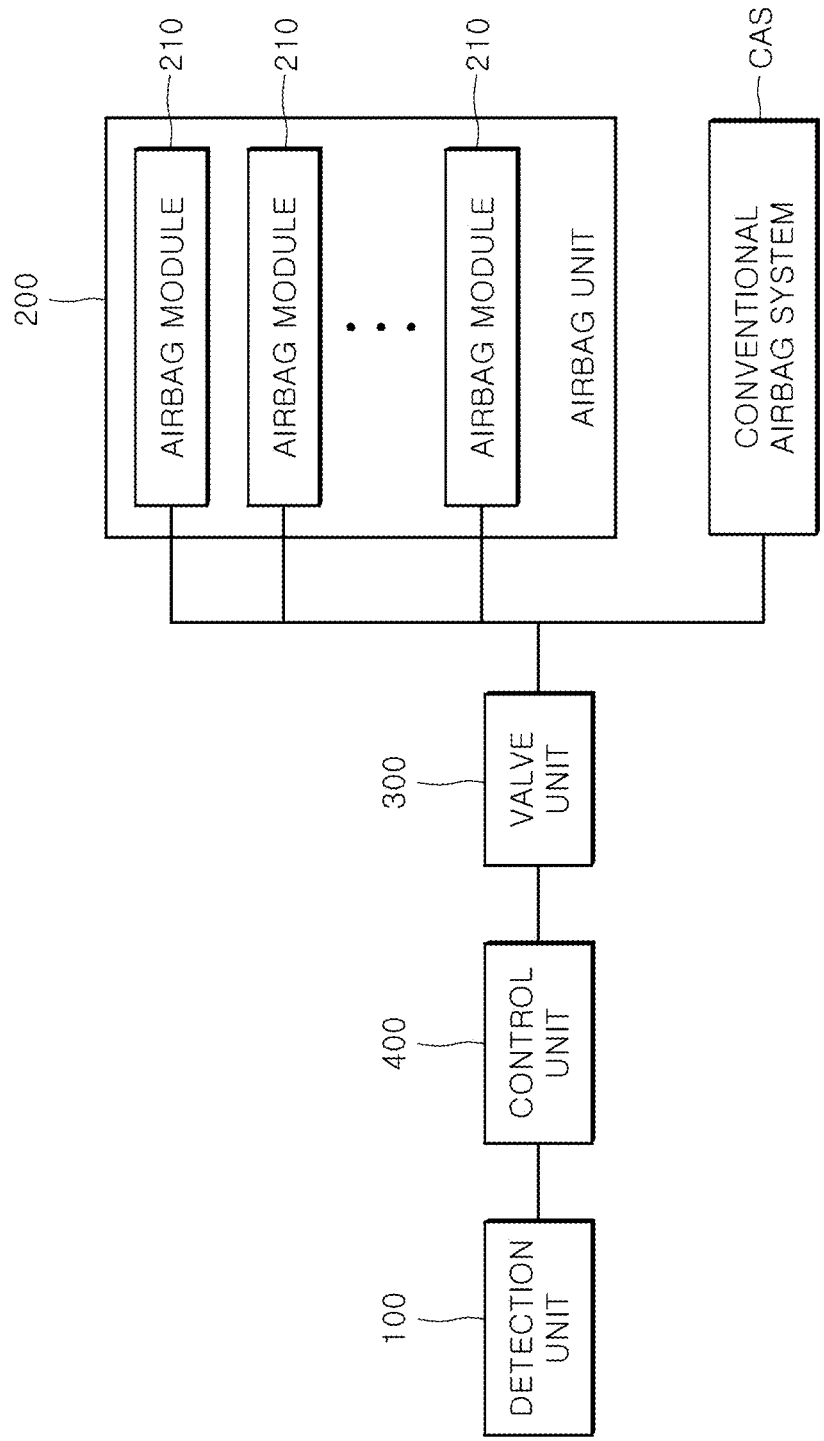
FIG. 1 is a block diagram for explaining the configuration of an airbag device of a vehicle in accordance with an embodiment of the present disclosure.

Hereinafter, an airbag device of a vehicle and a control method thereof in accordance with an embodiment of the present disclosure will be described in detail with reference to the accompanying drawings. In this process, the thicknesses of lines or the sizes of elements illustrated in the drawings may be exaggerated for the purpose of clarity and convenience of explanation. Furthermore, terms to be described later are terms defined in consideration of functions thereof in the present disclosure and may be changed according to the intention of a user or an operator, or practice. Accordingly, such terms should be defined based on the disclosure over the present specification.

Figure 5:
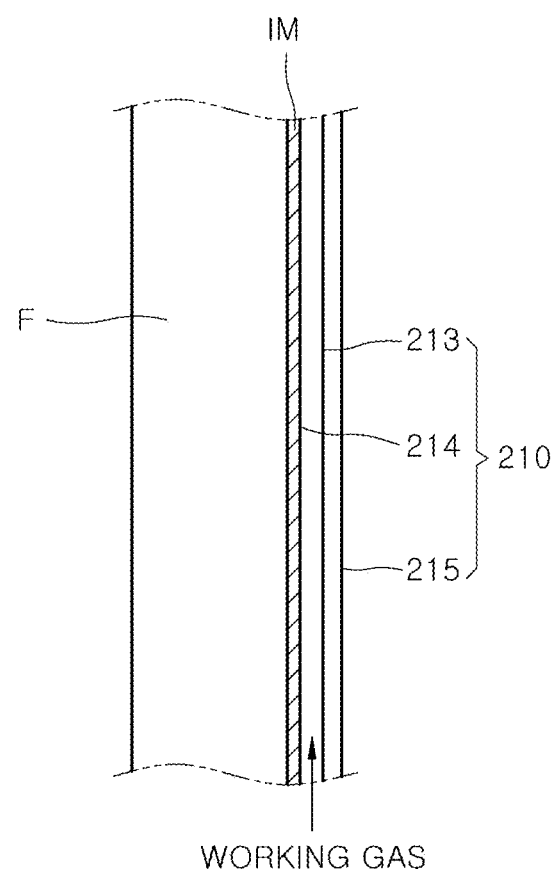
Figure 6:
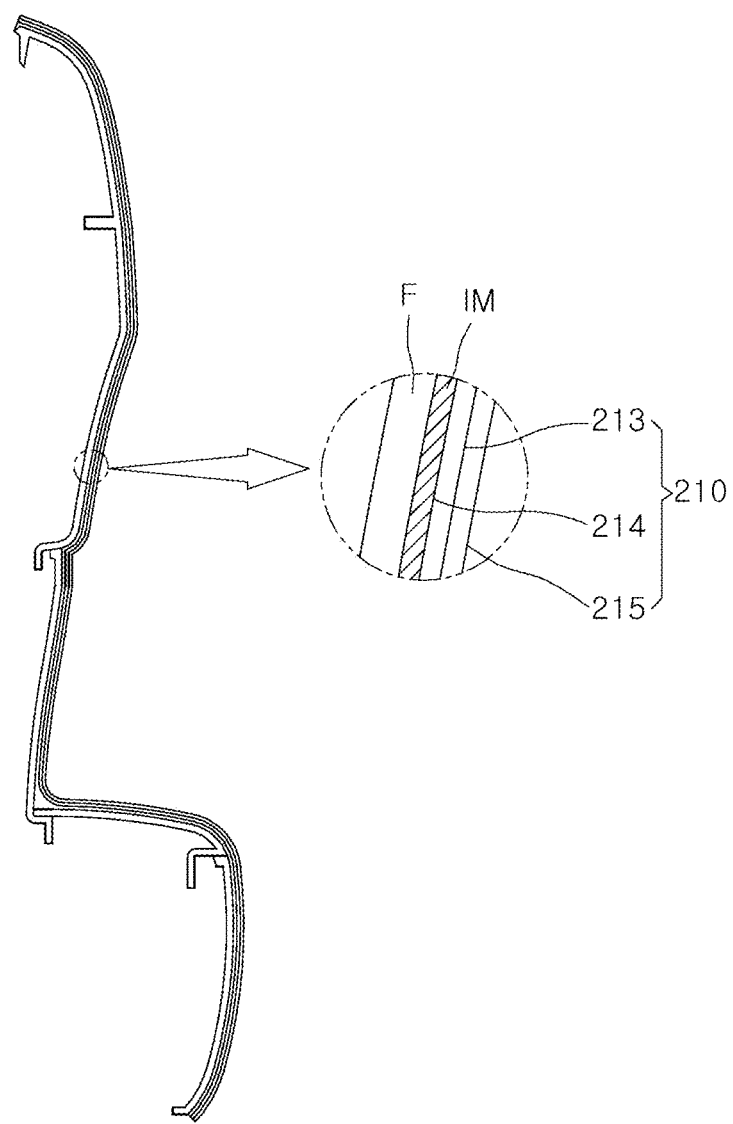
Figure 7:
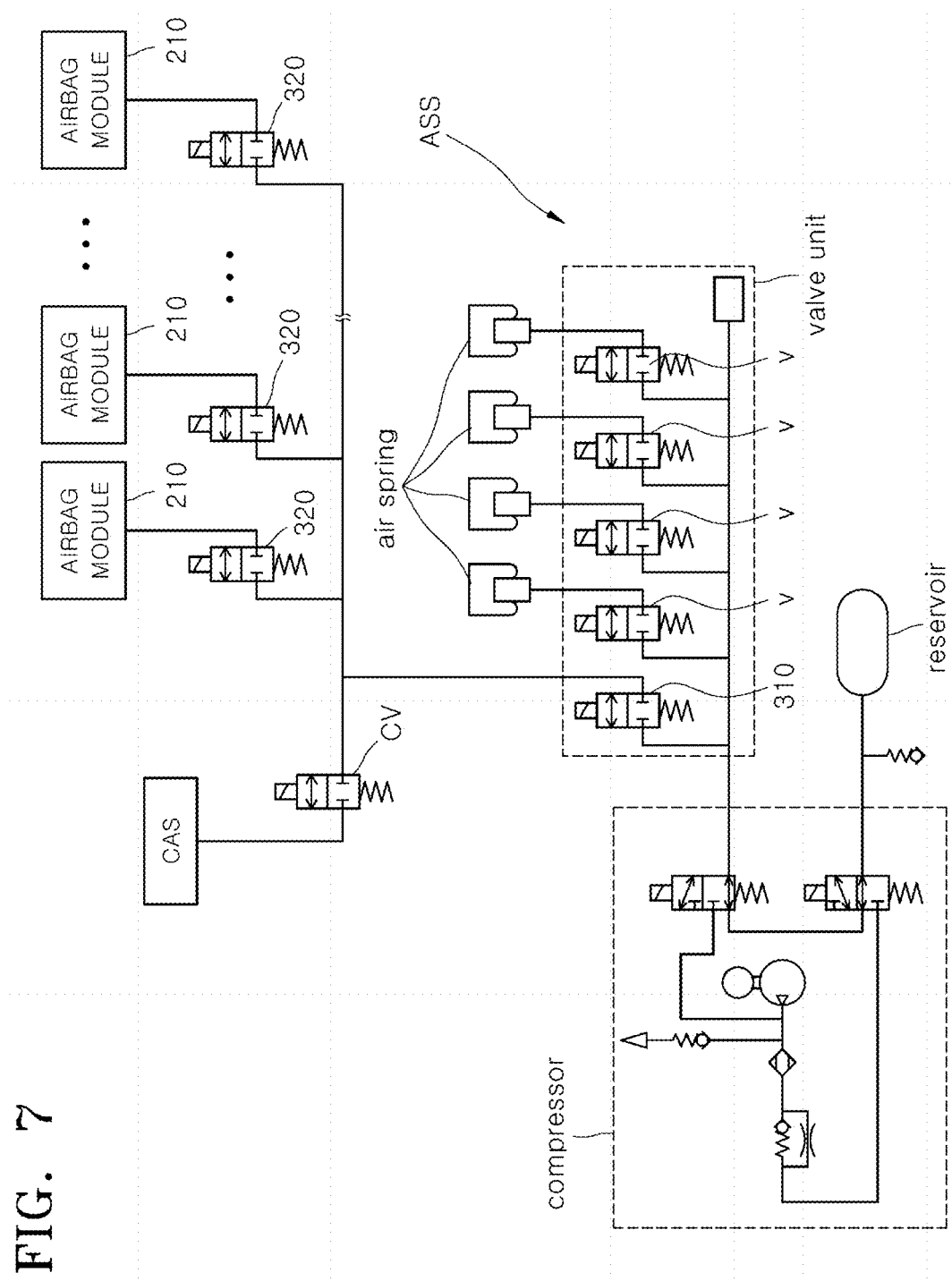
FIG. 7 is an exemplary view illustrating a structure in which working gas is supplied from an air suspension system in the airbag device of a vehicle in accordance with an embodiment of the present disclosure.

FIG. 1 is a block diagram for explaining the configuration of an airbag device of a vehicle in accordance with an embodiment of the present disclosure, FIG. 2 to FIG. 6 are exemplary views illustrating the structure of an airbag unit in the airbag device of a vehicle in accordance with an embodiment of the present disclosure, and FIG. 7 is an exemplary view illustrating a structure in which working gas is supplied from an air suspension system in the airbag device of a vehicle in accordance with an embodiment of the present disclosure.

Referring to FIG. 1 to FIG. 7, the airbag device of a vehicle in accordance with an embodiment of the present disclosure may include a detection unit 100, an airbag unit 200, a valve unit 300, and a control unit 400.

The detection unit 100 may detect collision information of a vehicle and seating state information of an occupant and transmit the detected information to the control unit 400 to be described below. The collision information of the vehicle may include information on the amount of impact caused by a collision between the vehicle and an external object, and the detection unit 100 may include a collision sensor (for example, an acceleration sensor, a gyro sensor, and the like) in order to detect the collision information. The seating state information of the occupant may include image information of the occupant in an interior space of the vehicle, and the detection unit 100 may include an image recognition sensor (for example, a camera sensor) in order to detect the seating state information. The collision information of the vehicle and the seating state information of the occupant detected by the detection unit 100 may be used for determining a hitting position as will be described below.

The airbag unit 200 is defined as a configuration including a plurality of airbag modules 210 respectively installed at a plurality of positions of an interior material IM formed in the interior space of the vehicle. The interior material IM in which the airbag modules 210 are installed may include a head lining interior material, a dashboard interior material, a pillar interior material, and a door interior material of the vehicle, and other trim interior materials inside the vehicle. Each of the airbag modules 210 may be installed for each interior material IM as described above, and may be selectively operated according to a hitting position determined by the control unit 400.

Figure 2:
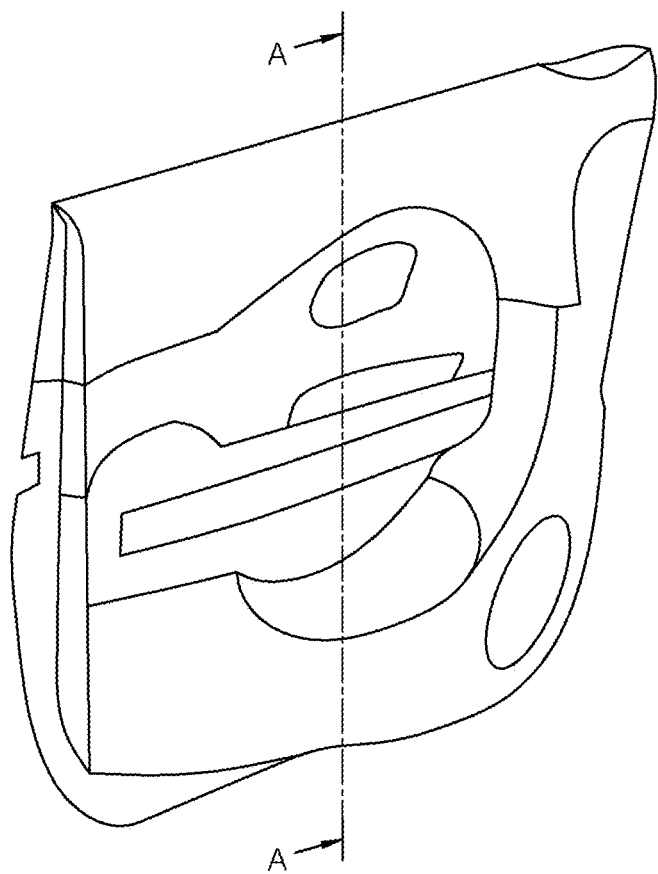
FIG. 2 to FIG. 6 are exemplary views illustrating the structure of an airbag unit in the airbag device of a vehicle in accordance with an embodiment of the present disclosure.

In the present embodiment, each of the airbag modules 210 may be configured to be inflated in a contracted state as working gas is supplied from the valve unit 300 to be described below, and then to be restored to the contracted state as the working gas is discharged. FIG. 2 illustrates a door part of the vehicle, and FIG. 3 to FIG. 6 each illustrate an example of a structure in which the airbag module 210 of the present embodiment is implemented for a door interior material.

Figure 3:
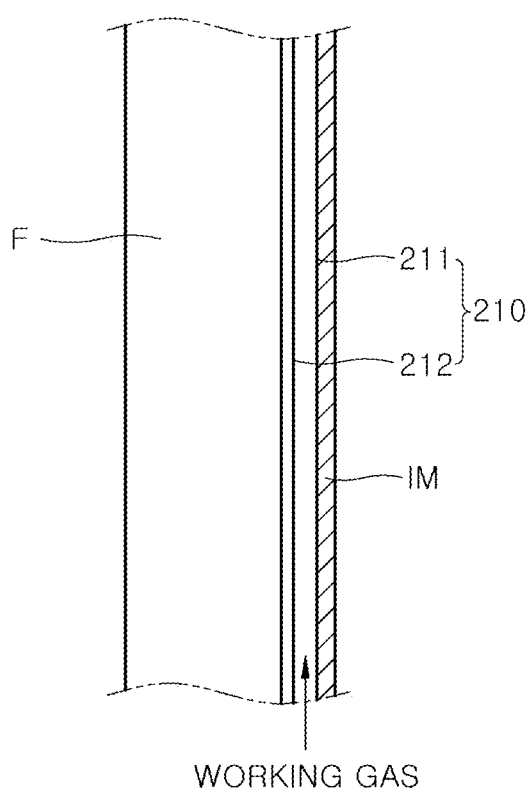
Figure 4:
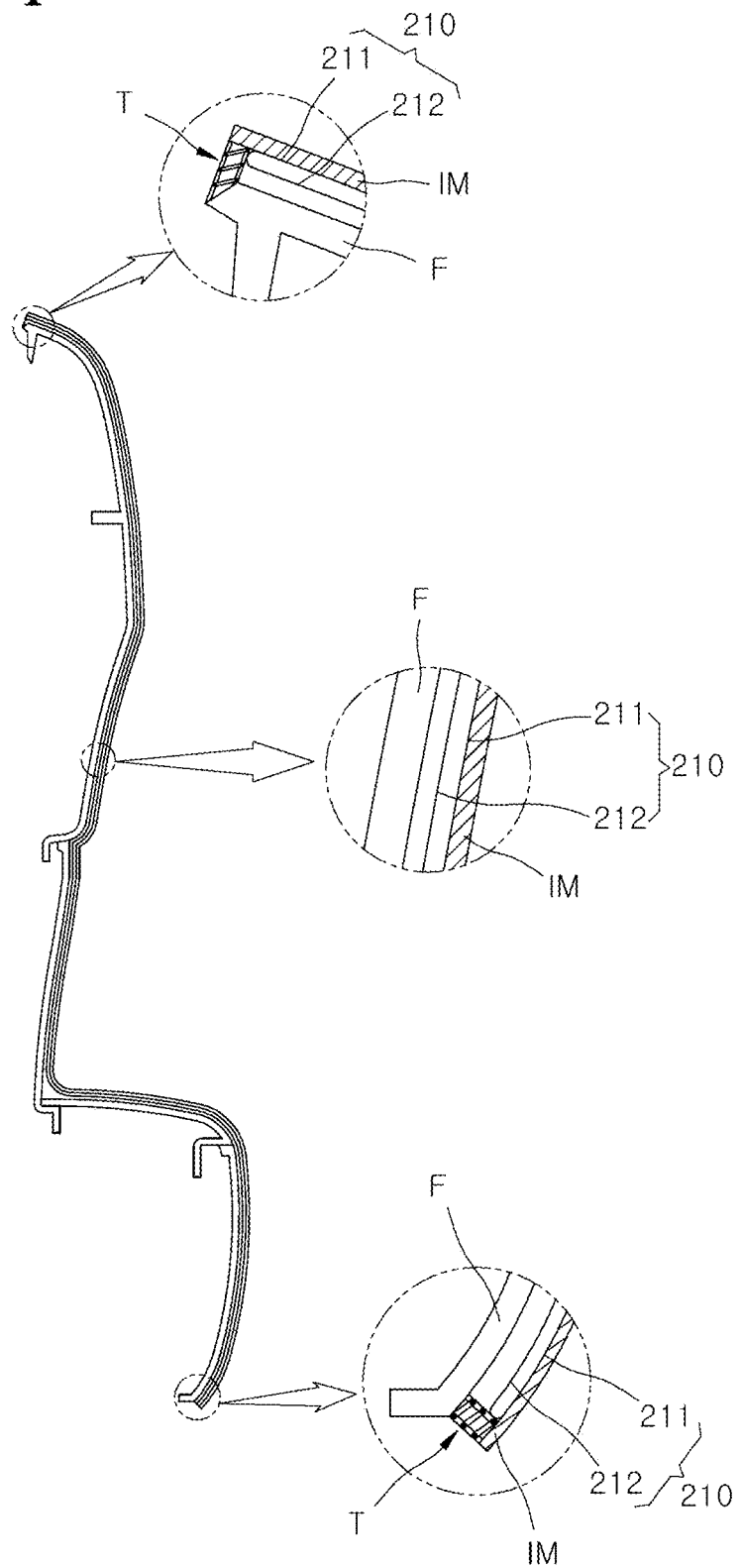

FIG. 3 illustrates a stack structure of a vehicle body frame F, the airbag module 210, and the interior material IM, and FIG. 4 illustrates an overall structure of the cross-section A-A of FIG. 2 together with a partially enlarged view. Referring to FIG. 3 and FIG. 4, the airbag module 210 may be installed between an inner surface of the interior material IM and the vehicle body frame F, and may be configured to be inflated as working gas is supplied between an outer layer 211 and an inner layer 212 of the airbag module 210 and to expand the interior material IM toward the occupant. That is, the airbag module 210 initially exists in a contracted state, and is inflated when working gas is supplied under the control of the control unit 400 in the event of a collision of the vehicle. As the airbag module 210 is inflated, the interior material IM is expanded toward the occupant to form a cushion, so that the occupant may be protected. In such a case, in order to effectively protect the occupant, the interior material IM that hits the occupant may be implemented with an appropriate material according to the intention of a designer.

In the embodiment of FIG. 3 and FIG. 4, a tether part T is further provided, and the tether part T performs a function of coupling the interior material IM to the vehicle body frame F so that the position of the interior material IM is changed with respect to the vehicle body frame F, and substantially preventing scattering of the airbag module 210. Specifically, the tether part T may be configured to closely fix the interior material IM to the vehicle body frame F in the contracted state of the airbag module 210, and to be extended along with the inflation of the airbag module 210. A space in which the airbag module 210 may be inflated may be secured according to the extension/contraction operation of the tether part T, and the position of the interior material IM may be changed with respect to the vehicle body frame F. In order to perform the above operation, the tether part T may be implemented with a stretchable elastic material. FIG. 4 illustrates an example in which the tether parts T are provided at both ends of the interior material IM, respectively, but the number of tether parts T may be selected as an appropriate number according to the intention of a designer and experimental results within the range in which a space in which the airbag module 210 may be inflated is secured and the position of the interior material IM may be changed with respect to the vehicle body frame F.

Meanwhile, the airbag module 210 may be configured to be restored to the contracted state as working gas is discharged after being inflated. In such a case, in an embodiment in which a part of the surface of the airbag module 210 and the surface of the interior material IM may be implemented in an uncoated state so that working gas is naturally discharged through the uncoated region on the surface of the airbag module 210 and the surface of the interior material IM. In another embodiment, a physical through structure may be adopted in which a vent hole is formed in the airbag module 210 and the interior material IM and working gas is discharged therethrough. In such a case, the size of the vent hole may be optimized and predefined by experimental results of a designer to the extent that when working gas is introduced into the airbag module 210, the amount of inflow gas is made relatively larger than that of outflow gas discharged through the vent hole, which does not cause no influence on the inflation of the airbag module 210.

Accordingly, when a vehicle collision occurs, working gas is supplied into the airbag module 210 initially existing in the contracted state to inflate the airbag module 210, the tether part T is extended as the airbag module 210 is inflated, and the interior material IM is expanded toward the occupant to form a cushion, so that the occupant may be protected. Then, the working gas is discharged through the above uncoated region or the vent hole, the tether part T is compressed, and the interior material IM is closely fixed to the vehicle body frame F by the compressed tether part T, so that the airbag module 210 may be restored to the initial contracted state.

FIG. 5 and FIG. 6 illustrate an example of another implementation structure of the airbag module 210. FIG. 5 illustrates a stack structure of the vehicle body frame F, the interior material IM, and the airbag module 210, and FIG. 6 illustrates an overall structure of the cross-section A-A of FIG. 2 together with a partially enlarged view. In such an embodiment, the airbag module 210 is installed on an outer surface of the interior material IM. Specifically, as illustrated in FIG. 5, the airbag module 210 may include a protective film skin 215 configured to cover the interior material IM, and cushion parts 213 and 214 installed between the protective film skin 215 and the outer surface of the interior material IM. The protective film skin 215 may be formed in a structure of surrounding the outer side of the cushion parts and perform a function of substantially preventing damage to the cushion parts, and may be implemented with a material of leather or propylene-based PU, PO, or PP.

In the example of FIG. 5 and FIG. 6, the cushion parts 213 and 214 of the airbag module 210 initially exist in a contracted state, and when working gas is supplied between the cushion parts 213 and 214 under the control of the control unit 400 as a vehicle collision occurs, the cushion parts 213 and 214 are inflated to form a cushion, so that an occupant may be protected. In order to discharge the working gas, as in the example of FIG. 3 and FIG. 4, a structure may be adopted in which a part of the surface of the cushion part and the surface of the protective film skin 215 is implemented in an uncoated state or a structure in which a vent hole is formed in the surface of the cushion part and the surface of the protective film skin 215.

Next, the valve unit 300 may operate to regulate working gas supplied to the airbag unit 200, under the control of the control unit 400. As illustrated in FIG. 7, the valve unit 300 may include a main valve 310 and a plurality of sub-valves 320 respectively provided in flow paths connected from the main valve 310 to the plurality of airbag modules 210, and the main valve 310 may be integrated into a valve unit constituting an air suspension system (ASS) previously applied to the vehicle.

FIG. 7 illustrates a structure in which working gas is supplied from the air suspension system (ASS) to the airbag modules 210 through the valve unit 300. The air suspension system (ASS) includes a reservoir, a compressor, the valve unit, and an air spring, and air compressed by the compressor is supplied to the air spring or the air is discharged from the air spring and stored in the reservoir. At this time, each on-off valve v of the valve unit selectively regulates the flow path.

The main valve 310 included in the valve unit 300 may be integrated into the valve unit as one on-off valve v constituting the valve unit of the air suspension system (ASS), which makes it possible to implement a structure in which air compressed by the compressor is supplied to the airbag modules 210 through the main valve 310 and the sub-valves 320. Accordingly, a structure is implemented in which working gas is supplied from the air suspension system (ASS) through the main valve 310 and the sub-valves 320 to inflate the airbag modules 210, and the airbag modules 210 are restored to a contracted state as the working gas is naturally discharged, which makes it possible to implement a reusable airbag system by overcoming the limitation of an airbag system limited to one-time deployment in the related art.

Meanwhile, a conventional airbag system (CAS), which is installed independently of the airbag unit 200 at a position different from a position where the airbag unit 200 is installed, may be applied to a vehicle to which the present embodiment is applied. The conventional airbag system (CAS) may include at least one of a driver airbag, a passenger airbag, a side airbag, a curtain airbag, and a center airbag, which are mounted by default on a vehicle, and when an occupant is seated according to a predefined normal seating condition, the conventional airbag system (CAS) may be controlled to protect the occupant by the control unit 400. The aforementioned normal seating condition may be predefined in the control unit 400 as a condition for determining whether the occupant is sitting in a vehicle seat in a general pose. For example, the control unit 400 may calculate a similarity or overlap rate between a current pose of the occupant acquired from the image information of the occupant and a reference pose predefined as corresponding to a state in which the occupant is generally seated in the vehicle seat, and determine that the normal seating condition is satisfied when the calculated value is equal to or greater than a reference value. An algorithm for calculating the aforementioned similarity or overlap rate may be predefined in the control unit 400.

As is well known, the aforementioned conventional airbag system (CAS) operates to inflate by receiving working gas generated by an inflator. In addition, the present embodiment adopts a structure in which the conventional airbag system (CAS) may be inflated by additionally receiving working gas from the main valve 310 (that is, the aforementioned air suspension system (ASS)) of the valve unit 300. That is, the present embodiment adopts a configuration of further improving a protective operation of the conventional airbag system (CAS) by expanding and applying a configuration, which operates the airbag unit 200 provided in the present embodiment by receiving working gas from the air suspension system (ASS) to the conventional airbag system (CAS) previously applied to the vehicle. In such a case, as illustrated in FIG. 7, a first flow path, through which the working gas is supplied from the main valve 310 to the airbag unit 200, and a second flow path, through which the working gas is supplied from the main valve 310 to the conventional airbag system (CAS), may share at least partially a common flow path. Accordingly, it is possible to minimize space requirements that occur when the configuration of the present embodiment is expanded and applied to the conventional airbag system (CAS). Meanwhile, a check valve CV, which regulates the supply of the working gas in order to limit an unnecessary operation of the conventional airbag system (CAS), may be provided on the second flow path (that is, a flow path of the second flow path not corresponding to the common flow path) extending from the aforementioned common flow path.

Next, the control unit 400 may determine a hitting position defined as the position of the interior material IM, at which the occupant is expected to be hit, on the basis of the collision information of the vehicle and the seating state information of the occupant detected by the detection unit 100, and control the valve unit 300 to supply the working gas to a target airbag module installed at the hitting position among the plurality of airbag modules 210, thereby inflating the target airbag module. The control unit 400 that performs the above operation may be functionally integrated into an ECU that controls the aforementioned air suspension system (ASS).

First, a process of determining the hitting position is described. As described above, the collision information of the vehicle may include the information on the amount of impact on the vehicle, and the seating state information of the occupant may include the image information of the occupant in the interior space of the vehicle. Accordingly, the control unit 400 may determine the hitting position on the basis of an impact direction acquired from the information on the amount of impact and a pose of the occupant acquired from the image information.

That is, since the information on the amount of impact corresponds to vector information including the magnitude of the amount of impact and the impact direction and the position of a head of the occupant may be detected through the pose of the occupant acquired from the image information, the control unit 400 may determine the position of the interior material IM, at which the head of the occupant is expected to be hit, that is, the hitting position, on the basis of the impact direction and the current position of the head of the occupant.

When the hitting position is determined, the control unit 400 may operate to control the valve unit 300 to supply the working gas to an airbag module (defined as a target airbag module) installed at the hitting position among the plurality of airbag modules 210, thereby inflating the target airbag module. That is, when the hitting position and the target airbag module are determined, the control unit 400 may control the target airbag module to be inflated by opening the main valve 310 and opening the sub-valve 320 connected to the target airbag module. Accordingly, even in various poses of the occupant, for example, even when the occupant is sleeping while lying on the seat, standing, reading a book or watching a display while sitting on the seat, and the like, a target airbag module for protecting the occupant may be determined and operated, thereby effectively protecting the occupant.

The control unit 400 may also complementarily control the airbag unit 200 and the conventional airbag system (CAS) according to the seating state information of the occupant. For convenience of description, the control of the control unit 400 for the airbag unit 200 and the control of the control unit 400 for the conventional airbag system (CAS) are defined as first control and second control, respectively.

The control unit 400 may perform the first control when the pose of the occupant acquired from the image information of the occupant does not satisfy the normal seating condition described above. That is, when the occupant is in an abnormal seating state in which the occupant is sleeping while lying on the seat, standing, or reading a book or watching a display while sitting on the seat, instead of in a general pose, the occupant may not be sufficiently protected through the conventional airbag system (CAS). Thus, the control unit 400 may determine a hitting position and perform the first control for inflating a target airbag module. In such a case, the control unit 400 may close the check valve CV described above so that the second control is unnecessarily performed.

On the other hand, the control unit 400 may perform the second control when the pose of the occupant acquired from the image information of the occupant satisfies the normal seating condition. That is, when the occupant is sitting in the vehicle seat in a general pose, the occupant may be protected only by the conventional airbag system (CAS). Thus, the control unit 400 may perform only the second control without performing the unnecessary first control.

Figure 8:
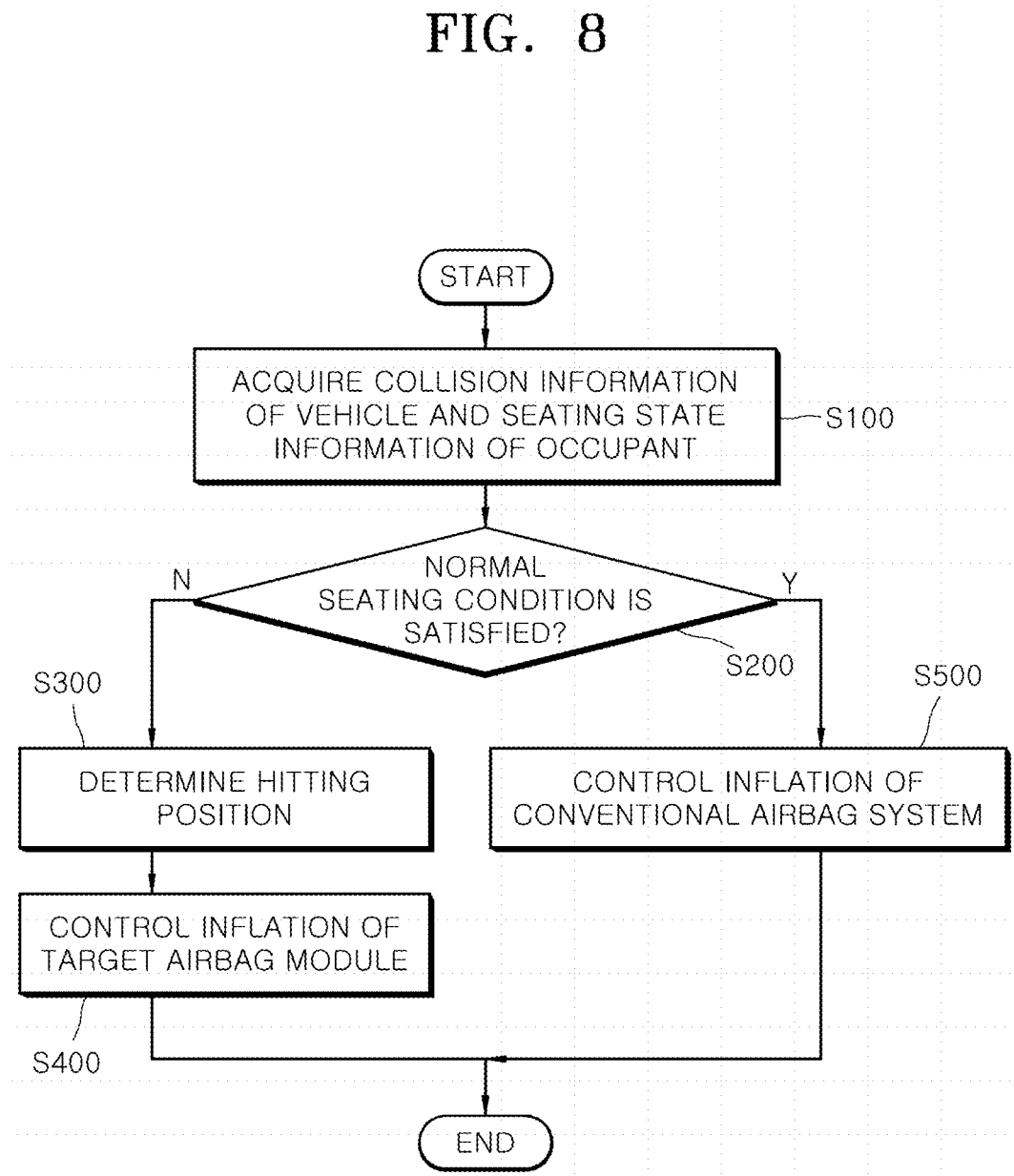
FIG. 8 is a flowchart for explaining a control method of the airbag device of a vehicle in accordance with an embodiment of the present disclosure.

FIG. 8 is a flowchart for explaining a control method of the airbag device of a vehicle in accordance with an embodiment of the present disclosure. Hereinafter, the control method of the airbag device of a vehicle in accordance with an embodiment of the present disclosure is described with reference to FIG. 8, and the following description is focused on the time-series configuration of the control method, except a description overlapping the aforementioned description.

First, the control unit 400 acquires the collision information of the vehicle and the seating state information of the occupant detected by the detection unit 100 (S100).

Next, the control unit 400 determines whether the pose of the occupant acquired from the image information of the occupant satisfies the normal seating condition (S200).

When it is determined in step S200 that the pose of the occupant does not satisfy the normal seating condition, the control unit 400 determines the hitting position defined as the position of the interior material IM, at which the occupant is expected to be hit, on the basis of the collision information of the vehicle and the seating state information of the occupant acquired in step S100 (S300).

Then, the control unit 400 performs the first control for controlling the valve unit 300 to supply the working gas to a target airbag module installed at the hitting position among the plurality of airbag modules 210, thereby inflating the target airbag module (S400).

Meanwhile, when it is determined in step S200 that the pose of the occupant satisfies the normal seating condition, the control unit 400 performs the second control for inflating the conventional airbag system (CAS) (S500).

As described above, the present embodiment may protect an occupant in all directions in a vehicle interior by installing an airbag device in an interior material formed in an interior space of a vehicle instead of a fixed position in the related art, may reuse an airbag by adopting a structure in which working gas for deploying an airbag module is secured through an air suspension system applied to the vehicle and simultaneously is naturally discharged and disappear after the airbag is deployed, and may more completely protect the occupant of the vehicle from a collision through a method of complementarily operating the airbag device with a conventional airbag system previously applied to the vehicle.

Although the present disclosure has been described with reference to the embodiments illustrated in the drawings, the embodiments of the disclosure are for illustrative purposes only, and those skilled in the art will appreciate that various modifications and other equivalent embodiments are possible from the embodiments. Thus, the true technical scope of the present disclosure should be defined by the following claims.

What is claimed is:

1. An airbag device of a vehicle, the airbag device comprising:
    a detection unit configured to detect collision information of the vehicle and seating state information of an occupant;
    an airbag unit including a plurality of airbag modules respectively installed at a plurality of positions of an interior material formed in an interior space of the vehicle, each of the airbag modules being configured to be inflated from a contracted state as working gas is supplied and to be restored to the contracted state as the working gas is discharged;
    a valve unit configured to regulate the working gas supplied to the airbag unit; and
    a control unit configured to determine a hitting position defined as a position of the interior material, at which the occupant is expected to be hit, based on the collision information and the seating state information detected by the detection unit, and to control the valve unit to supply the working gas to a target airbag module installed at the hitting position, thereby inflating the target airbag module,
    wherein the valve unit includes a main valve and a plurality of sub-valves respectively provided in flow paths connected from the main valve to the plurality of airbag modules, and
    the main valve is integrated into a valve unit included in an air suspension system applied to the vehicle.

2. The airbag device according to claim 1, wherein the collision information includes information on an amount of impact on the vehicle, the seating state information includes image information of the occupant in an interior space of the vehicle, and
    the control unit determines the hitting position based on an impact direction acquired from the information on the amount of impact and a pose of the occupant acquired from the image information.

3. The airbag device according to claim 1, wherein at least one airbag module is installed between the interior material and a vehicle body frame, and is configured to be inflated as working gas is supplied and to expand the interior material toward the occupant.

4. The airbag device according to claim 3, further comprising:
    a tether part configured to couple the interior material to the vehicle body frame so that a position of the interior material is changed with respect to the vehicle body frame and to substantially prevent scattering of the airbag module,
    wherein the tether part comprises a stretchable elastic material and is configured to closely fix the interior material to the vehicle body frame in a contracted state of the airbag module, and to be extended along with inflation of the at least one airbag module.

5. The airbag device according to claim 1, wherein at least one airbag module includes a protective film skin configured to cover the interior material, and cushion parts installed between the protective film skin and an outer surface of the interior material.

6. The airbag device according to claim 1, wherein the vehicle comprises a conventional airbag system that is installed independently of the airbag unit at a position different from a position where the airbag unit is installed and is controlled to protect an occupant by the control unit when the occupant is seated according to a predefined normal seating condition, and
when control for the airbag unit and control for the conventional airbag system are defined as first control process and second control process, respectively, the control unit performs the first control process and the second control process according to the seating state information.

7. The airbag device according to claim 6, wherein the seating state information includes image information of the occupant in an interior space of the vehicle, and
the control unit performs the first control process when a pose of the occupant acquired from the image information does not satisfy the normal seating condition and performs the second control process when the pose of the occupant satisfies the normal seating condition.

8. The airbag device according to claim 1, wherein the control unit controls the valve unit to supply the working gas to the conventional airbag system, and
a first flow path, through which the working gas is supplied from the valve unit to the airbag unit, and a second flow path, through which the working gas is supplied from the valve unit to the conventional airbag system, share at least partially a common flow path.

9. A method of controlling an airbag device of a vehicle, the airbag device including a detection unit configured to detect collision information of the vehicle and seating state information of an occupant, an airbag unit including a plurality of airbag modules respectively installed at a plurality of positions of an interior material formed in an interior space of the vehicle, each of the airbag modules being configured to be inflated from a contracted state as working gas is supplied and to be restored to the contracted state as the working gas is discharged, and a valve unit configured to regulate the working gas supplied to the airbag unit,
the method comprising:
acquiring, by a control unit, the collision information and the seating state information detected by the detection unit;
determining, by the control unit, a hitting position defined as a position of the interior material, at which the occupant is expected to be hit, based on the acquired collision information and seating state information; and
controlling, by the control unit, the valve unit to supply the working gas to a target airbag module installed at the hitting position among the plurality of airbag modules, thereby inflating the target airbag module,
wherein the valve unit includes a main valve and a plurality of sub-valves respectively provided in flow paths connected from the main valve to the plurality of airbag modules, and
the main valve is integrated into a valve unit included in an air suspension system applied to the vehicle.

10. The method according to claim 9, wherein the collision information includes information on an amount of impact on the vehicle, the seating state information includes image information of the occupant in an interior space of the vehicle, and
in the determining step, the control unit determines the hitting position based on an impact direction acquired from the information on the amount of impact and a pose of the occupant acquired from the image information.

11. The method according to claim 9, wherein the vehicle comprises a conventional airbag system that is installed independently of the airbag unit at a position different from a position where the airbag unit is installed and is controlled to protect an occupant by the control unit when the occupant is seated according to a predefined normal seating condition, and
the control unit controls the airbag unit and the conventional airbag system according to the seating state information of the occupant.

12. The method according to claim 11, wherein the seating state information includes image information of the occupant in an interior space of the vehicle, and
the method further comprises, after the acquiring step:
determining, by the control unit, whether a pose of the occupant acquired from the image information satisfies the normal seating condition; and
controlling, by the control unit, the conventional airbag system when it is determined that the pose of the occupant satisfies the normal seating condition, wherein the determining and inflating steps are performed when it is determined that the pose of the occupant does not satisfy the normal seating condition.

* * * * *